United States Patent Office 3,112,117
Patented Nov. 26, 1963

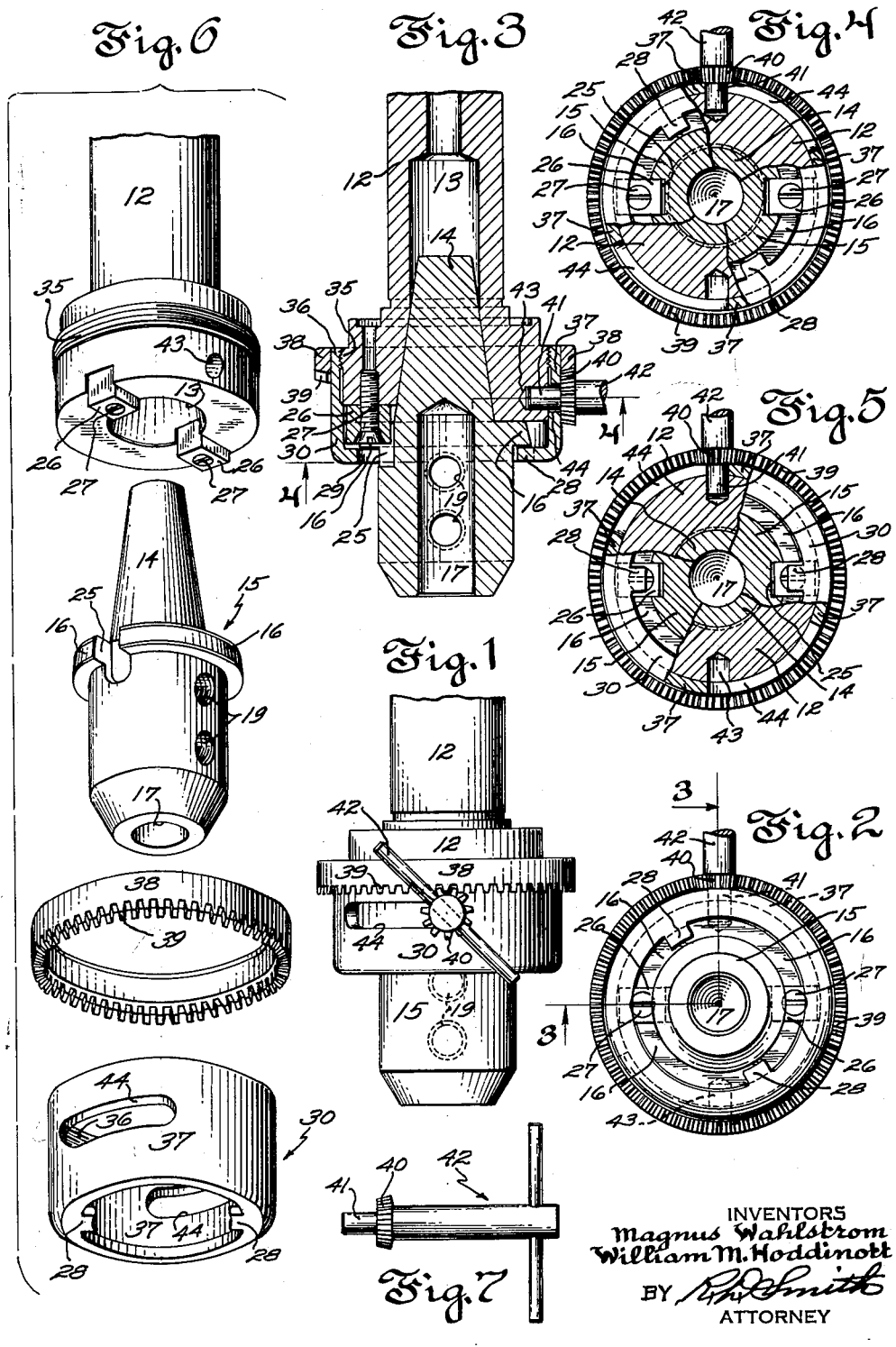

3,112,117
GEARED-KEY OPERATED JAWLESS QUICK
RELEASE CHUCK
Magnus Wahlstrom, Easton, and William M. Hoddinott, Milford, Conn., assignors to The Bridgeport Machines, Inc., Bridgeport, Conn., a corporation of Connecticut
Filed Nov. 8, 1960, Ser. No. 67,984
6 Claims. (Cl. 279—91)

This invention relates to a jawless chuck of the type that grips a tool or tool holder by tightening pressure exerted in an axial direction rather than by the closing of radially acting retractile jaws.

An object of the invention is to provide for the tightening and loosening, by means of a geared turn key, of a jawless chuck that is constructed for quick release mounting of interchangeable tool holders.

Another object is to make use of the presence of a removable gear type of key to limit what otherwise becomes unrestricted relative rotary movement between screw threaded parts that are relatively turned to lock the tool holders in the chuck body, and to limit such movement when the locking parts reach a rotary relationship that releases the holder for quick axial removal from the chuck.

A related object is to leave unrestricted the relative rotary movement of the screw threaded parts except when the chuck operating key is in place in order that the tool holder locking parts of the chuck can be fully unscrewed and completely separated at will without altering any of the permanent construction of the chuck.

A further object is to effect such limitation of the relative rotary movement of the screw threaded chuck parts in such manner that the removable chuck operating key when in place can serve the double purpose of loosening or tightening the tool holder retaining parts of the chuck and of arresting the relative rotary movement of such parts in their direction of releasing movement, so that the tool holder can quickly be withdrawn completely from the chuck in an axial direction without washing the time required to hunt or feel for a releasing position of the chuck parts or to fully unscrew them to a point of complete separation.

Still another object is to provide gear teeth at the inboard end rather than the outboard end of the cylindrical barrel of a ring nut that forms one of the aforesaid screw threaded parts of the chuck.

These and other objects of the invention will appear in fuller particular from the following description of a successful embodiment of the improvements, in which description reference is had to the accompanying drawings wherein:

FIG. 1 is a side elevation of the improved key operated quick release chuck and tool holder with the geared chuck operating key in place.

FIG. 2 is a bottom plan view looking upward at FIG. 1.

FIG. 3 is a view taken in section on the planes 3—3 in FIG. 2, looking in the directions of the arrows.

FIG. 4 is a view of diametrically opposite like portions of the chuck taken alternately on the planes 4—4 in FIG. 3, looking in the direction of the arrows with parts of tool holder.

FIG. 5 is like FIG. 4 showing the parts turned to a rotary relationship to release the tool holder.

FIG. 6 is an exploded perspective view of the parts shown in FIGS. 1–5.

FIG. 7 is a detail of the geared tightening and releasing key removed from the chuck.

In the drawings 12 designates any power driven spindle or arbor, such as that of a vertical milling machine or drill press, having the tapered socket 13 to receive the preferably tapered shank 14 of a tool or tool holder 15 having the lock flange 16, and if a tool holder, itself containing a socket 17 to receive any conventional tool such as a drill or end mill (not shown) which will be secured in the tool holder 15 by one or more set screws (not shown) received in the threaded holes 19.

Lock flange 16 of the tool holder 15 contains diametrically opposite notches 25 which extend part way into the body portion of the tool holder and serve as keyways of size to removably fit and rotatively interlock with driving keys 26 that are secured on the end of spindle 12 by holding screws 27 respectively. Notches 25 serve the additional purpose of permitting lock flange 16 to be passed axially by diametrically opposite lock lugs 28 that project radially inward from the aperture bordering edge 29 of a ring nut 30.

The power driven spindle 12 has external screw threads at 35 that mesh with internal screw threads 36 at the inboard end of ring nut 30. Also at the inboard end of the cylindrical wall 37 of ring nut 30 an external annular gear ring 38 is affixed, as by shrink fit or welding, whose gear teeth 39 are axially disposed to mesh with beveled pinion teeth 40 carried on the stem 41 of a geared type of chuck operating key 42.

In the side face of the powered spindle 12 there is sunk a small rotary bearing hole 43 in which can be anchored pivotally the end of key stem 41 after such stem has passed through a circumferential slot 44 in the cylindrical wall 37 of the skirt or barrel portion 37 of ring nut 30.

In operating the improved chuck and with turn key 42 detached the ring nut 30 is free to be screwed onto the threads 35 of spindle 12 whether or not tool holder 15 is in place in its socket 13. After such assembly of the ring nut with the spindle, key 42 can be put in place for use to turn the ring nut. Now since the notches 25 permit flange 16 to pass lugs 28 in an axial direction these notches will be found to slip into fitting engagement with rotary drive keys 26 so that the tapered shank 14 of the tool holder can be fully inserted in socket 13. After this, turning the ring nut in clockwise direction from the positions of lugs 28 in FIG. 5 to their positions in FIGS. 2 and 4 wipingly draws the tool holder flange 16 firmly into the socket 13 and holds it there until desired release. To release, the ring nut is merely turned in reverse direction until the end of one of the slots 44 encounters the key 42 whereupon the parts are restored as in FIG. 5 and the tool holder can be quickly and completely withdrawn from the chuck without separating ring nut 30 from the spindle 12.

The appended claims are directed to and intended to cover all obvious modifications of the particular construction and arrangement of parts herein shown which are fairly included in the definition of the invention as worded in the claims.

What is claimed is:

1. A geared-key operated jawless quick release chuck, comprising in combination with a chuck body carrying screw threads, a ring nut having mating screw threads and a skirt depending therebelow, a tool holder mounted in the chuck within the compass of said skirt, axially interlocking devices in part on said tool holder and in part on said ring nut capable of passing each other axially and cooperatively interengageable in a manner to act as a bayonet joint, a chuck tightening and loosening turn key, cooperatively enmeshed gear teeth on said ring nut and on said turn key, a rotor bearing in said chuck body receptive to said turn key, and a slot in said skirt in lateral register with said bearing to admit said turn key to the latter through said slot.

2. A geared-key operated jawless quick release chuck as defined in claim 1, together with rotary interlocking devices in part on the said chuck body and in part on the said tool holder engageable in a manner to permit free separation of said holder from said body in an axial direction.

3. A geared-key operated jawless quick release chuck as defined in claim 2, in which the slot in the said skirt is so angularly related rotatively to the said axially interlocking devices that said devices can pass each other axially to permit removal of the said tool holder from the chuck when the end of said slot encounters the said turn key.

4. A geared-key operated jawless chuck with quick release mounting for tool holders, comprising the combination with a tool holder having a mounting shank and a circumferential lock flange containing axial release notches of, a chuck body equipped with external screw threads and having an end socket receptive to said shank, means to interlock said tool holder and chuck body in fixed rotary relation in a manner permitting their separation in an axial direction, a ring nut in mesh with said screw threads having a skirt comprising a cylindrical wall telescopically sleeved over said flange of the tool holder equipped with inward projecting lock lugs angularly disposed to register with and axially pass through said release notches in one rotary relationship of said ring nut and said tool holder and thereafter to slidably bear retainingly against said lock flange during relative rotary movement between said ring nut and said tool holder, driveable gear teeth fixed on said ring nut, a ring nut tightening key of the geared type having a stem equipped with driving pinion teeth meshable with said drivable gear teeth, a rotor bearing receptive to the end of said key stem sunk in the peripheral surface of said chuck body within the compass of said skirt of the ring nut, and a circumferential slot of limited arcuate extent in said cylindrical wall of said skirt in register axially with said rotor bearing, whereby said stem of the nut tightening key can pass through said slot into pivotally anchored engagement with said bearing and thereby limit rotary movement of said ring nut relative to said chuck body.

5. A geared-key operated jawless chuck as defined in claim 4, in which an end of said slot in the said skirt is so angularly related to one of the said lock lugs as to abut against the said stem of the said nut tightening key when the said lock lugs register rotatively with the said release notches in the loosening direction of relative movement between said nut and said chuck body.

6. A geared-key operated jawless chuck as defined in claim 4, in which the said gear teeth and the said screw threads are on the external and internal surfaces respectively of said ring nut in approximately the same location axially thereof.

References Cited in the file of this patent
UNITED STATES PATENTS

| | | |
|---|---|---|
| 2,579,082 | Kramer | Dec. 18, 1951 |
| 2,611,621 | Patterson | Sept. 23, 1952 |
| 2,719,722 | Nickless | Oct. 4, 1955 |
| 2,727,748 | Benjamin | Dec. 20, 1955 |
| 2,931,659 | Novkov | Apr. 5, 1960 |